(12) United States Patent
Sheng et al.

(10) Patent No.: US 10,805,361 B2
(45) Date of Patent: Oct. 13, 2020

(54) COMMUNICATION SESSION PRESERVATION IN GEOGRAPHICALLY REDUNDANT CLOUD-BASED SYSTEMS

(71) Applicant: Sansay, Inc., San Diego, CA (US)

(72) Inventors: Jonqjeng Max Sheng, San Diego, CA (US); Gerald T. Ryner, San Diego, CA (US)

(73) Assignee: Sansay, Inc., San Diego, CA (US)

( * ) Notice: Subject to any disclaimer, the term of this patent is extended or adjusted under 35 U.S.C. 154(b) by 0 days.

(21) Appl. No.: 16/230,004

(22) Filed: Dec. 21, 2018

(65) Prior Publication Data

US 2020/0204597 A1 Jun. 25, 2020

(51) Int. Cl.
*H04L 29/06* (2006.01)
*H04L 29/08* (2006.01)

(52) U.S. Cl.
CPC ...... *H04L 65/1083* (2013.01); *H04L 65/1006* (2013.01); *H04L 65/40* (2013.01); *H04L 67/10* (2013.01)

(58) Field of Classification Search
CPC . H04L 65/1083; H04L 65/1006; H04L 67/10; H04L 65/40
See application file for complete search history.

(56) References Cited

U.S. PATENT DOCUMENTS

| | | | |
|---|---|---|---|
| 5,713,043 A | 1/1998 | Baugher et al. | |
| 6,480,901 B1 | 11/2002 | Weber et al. | |
| 6,938,090 B2 | 8/2005 | Isomaki | |
| 7,216,165 B2 | 5/2007 | Dalal et al. | |
| 7,430,179 B2 | 9/2008 | Towns-von Stauber et al. | |
| 7,647,616 B2 | 1/2010 | Puthiyedath | |
| 7,835,293 B2 | 11/2010 | Cidon et al. | |
| 7,983,254 B2 | 7/2011 | Alt et al. | |
| 8,024,439 B2 | 9/2011 | Nalla et al. | |

(Continued)

FOREIGN PATENT DOCUMENTS

| | | |
|---|---|---|
| EP | 1763173 | 3/2007 |
| WO | 2003055147 | 7/2003 |

(Continued)

*Primary Examiner* — Mohammad S Anwar
(74) *Attorney, Agent, or Firm* — Proskauer Rose LLP

(57) ABSTRACT

Methods and apparatuses, including computer program products, are described for preservation of communication sessions in a geographically redundant cloud-based environment. The system comprises a plurality of end point devices and a plurality of cloud-based system instances, each comprising one or more server computing devices. A first cloud-based system instance assigned a first physical address is configured to establish a communication session using the first physical address between a first end point device and a second end point device, and mirror information associated with the communication session to a second cloud-based system instance assigned a second physical address. The second cloud-based system instance is configured to detect a failure of the first cloud-based system instance during the communication session, take control of the communication session using the mirrored information, and maintain the communication session between the first end point device and the second end point device using the second physical address.

7 Claims, 7 Drawing Sheets

(56) References Cited

U.S. PATENT DOCUMENTS

| | | |
|---|---|---|
| 8,054,827 B2 | 11/2011 | Riley et al. |
| 8,204,064 B2 | 6/2012 | MeLampy et al. |
| 8,218,458 B2 | 7/2012 | Flynn et al. |
| 8,233,484 B2 | 7/2012 | Hiribarren et al. |
| 8,249,076 B1 | 8/2012 | Bertone et al. |
| 8,250,634 B2 | 8/2012 | Agarwal et al. |
| 8,305,913 B2 | 11/2012 | Ei-Hennawey et al. |
| 8,312,169 B2 | 11/2012 | Perumal et al. |
| 8,325,741 B2 | 12/2012 | Zhu |
| 8,351,344 B2 | 1/2013 | Jung et al. |
| 8,417,828 B2 | 4/2013 | Ma et al. |
| 8,451,830 B2 | 5/2013 | Sul |
| 8,467,321 B1 | 6/2013 | Groenjes et al. |
| 8,559,320 B2 | 10/2013 | Khanduri |
| 8,601,144 B1 | 12/2013 | Ryner |
| 8,606,899 B1 | 12/2013 | Ryner et al. |
| 8,695,077 B1 | 4/2014 | Gerhard et al. |
| 8,725,885 B1 | 5/2014 | Ryner |
| 8,738,774 B2 | 5/2014 | Sheng et al. |
| 2002/0120749 A1 | 8/2002 | Widegren et al. |
| 2002/0184510 A1 | 12/2002 | Shieh |
| 2003/0016627 A1 | 1/2003 | MeLampy et al. |
| 2003/0093513 A1 | 5/2003 | Hicks et al. |
| 2003/0120135 A1 | 6/2003 | Gopinathan et al. |
| 2003/0159067 A1 | 8/2003 | Stirbu |
| 2005/0044188 A1 | 2/2005 | Nakazawa et al. |
| 2006/0015463 A1 | 1/2006 | Gupta et al. |
| 2007/0104182 A1 | 5/2007 | Gorti et al. |
| 2008/0049738 A1 | 2/2008 | Joung et al. |
| 2008/0259943 A1 | 10/2008 | Miyajima et al. |
| 2009/0006633 A1 | 1/2009 | Moore et al. |
| 2009/0135842 A1 | 5/2009 | Zhu |
| 2009/0161843 A1 | 6/2009 | Sylvain |
| 2009/0164645 A1 | 6/2009 | Sylvain |
| 2009/0234940 A1 | 9/2009 | Pal et al. |
| 2009/0241176 A1 | 9/2009 | Beletski et al. |
| 2009/0245233 A1 | 10/2009 | Prasad et al. |
| 2009/0268713 A1 | 10/2009 | Ottur et al. |
| 2009/0274146 A1 | 11/2009 | Zhu |
| 2010/0115598 A1 | 5/2010 | Barriga et al. |
| 2010/0131621 A1 | 5/2010 | Zetterlund et al. |
| 2010/0217874 A1 | 8/2010 | Anantharaman et al. |
| 2010/0293297 A1 | 11/2010 | Perumal et al. |
| 2010/0312880 A1 | 12/2010 | Veits |
| 2011/0060835 A1 | 3/2011 | Dorso et al. |
| 2011/0122885 A1 | 5/2011 | Hedman et al. |
| 2011/0164535 A1* | 7/2011 | Gillipalli ............ H04M 3/4288 370/259 |
| 2011/0173689 A1 | 7/2011 | Kim et al. |
| 2011/0191493 A1 | 8/2011 | Lee et al. |
| 2011/0289221 A1 | 11/2011 | Lowekamp |
| 2012/0065813 A1 | 3/2012 | Nguyen et al. |
| 2012/0142341 A1 | 6/2012 | Nagpal et al. |
| 2012/0158974 A1 | 6/2012 | Perumal et al. |
| 2012/0233327 A1 | 9/2012 | Smith et al. |
| 2012/0300242 A1 | 11/2012 | Meike et al. |
| 2013/0044620 A1 | 2/2013 | Sul |
| 2013/0089187 A1 | 4/2013 | Stahl |
| 2013/0163446 A1 | 6/2013 | Kruger et al. |
| 2013/0185440 A1 | 7/2013 | Blau et al. |
| 2013/0326062 A1 | 12/2013 | Ryner et al. |
| 2013/0326551 A1 | 12/2013 | Chatterjee et al. |
| 2014/0013346 A1 | 1/2014 | Amsterdam et al. |
| 2014/0029462 A1 | 1/2014 | Stewart |
| 2014/0043994 A1 | 2/2014 | Bansal et al. |
| 2014/0229614 A1 | 8/2014 | Aggarwal et al. |
| 2016/0119275 A1* | 4/2016 | Liebherr ............ H04L 61/1511 709/220 |

FOREIGN PATENT DOCUMENTS

| | | |
|---|---|---|
| WO | 2003069857 | 8/2003 |
| WO | 2012060747 | 5/2012 |
| WO | 2012136633 | 10/2012 |

* cited by examiner

COMMUNICATION SESSION PRESERVATION IN GEOGRAPHICALLY REDUNDANT CLOUD-BASED SYSTEMS

TECHNICAL FIELD

This application relates generally to methods and apparatuses, including computer program products, for communication session preservation in geographically redundant cloud-based systems.

BACKGROUND

Voice client devices and video client devices (such as VoIP or SIP end user devices) and peers currently establish communication sessions over internet networks to computing systems responsible for the authorization and treatment of those sessions. However, the computing systems in the network are inherently subject to failure due to a variety of reasons—including hardware failure, software failure, and/or network failure.

Call preservation, sometimes referred to as system High Availability (HA), within a VoIP or SIP network is typically performed by two computing systems sharing a same physical address (e.g., IP address) in the network. One system can be designated as the primary system for establishing and handling communication sessions, and the other system can be designated as the backup or redundancy system. When the primary system fails, the backup system can assume the physical address of the primary system—e.g., through use of a floating or virtual IP address—so that the end point devices and peers can continue to communicate using the affected communication sessions without experiencing a change or disruption to the sessions (e.g., dropped call, forcing a client device to place a new call into the network).

Recently, VoIP and SIP communication systems and techniques have been deployed on cloud-based platforms (e.g., the AWS platform available from Amazon, Inc.) that comprise a series of geographically distinct system instances. Such cloud platforms generally do not allow a system instance to share the physical address of another system instance. As a result, traditional session preservation techniques, such as sharing a physical address, cannot be used in a cloud-based environment.

SUMMARY

What is needed is a system and method to enable the preservation of communication sessions in cloud-based environments when certain disruptions occur, while allowing the physical address(es) associated with the communication session to change.

The technology, in one aspect, features a system for preservation of communication sessions in a geographically redundant cloud-based environment. The system comprises a plurality of end point devices and a plurality of cloud-based system instances, each comprising one or more server computing devices. A first cloud-based system instance assigned a first set of one or more physical addresses is configured to establish a communication session using at least one address in the first set of physical addresses between a first end point device and a second end point device, and mirror information associated with the communication session to a second cloud-based system instance assigned one or more second physical addresses. The second cloud-based system instance is configured to detect a failure of the first cloud-based system instance during the communication session, take control of the communication session using the mirrored information, maintain the communication session between the first end point device and the second end point device using at least one address in the second set of physical addresses.

The above aspect can include one or more of the following features. In some embodiments, each of the plurality of cloud-based system instances are in a different geographical location. In some embodiments, the addresses in the first set of physical addresses are different from the addresses in the second set physical addresses. In some embodiments, the communication session is a Session Initiation Protocol (SIP) session. In some embodiments, the communication session is a Voice-over-IP (VoIP) session. In some embodiments, the first end point device is a SIP User Agent (UA) and the second end point device is a SIP UA. In some embodiments, the first end point device is a SIP Peer.

Other aspects and advantages of the technology will become apparent from the following detailed description, taken in conjunction with the accompanying drawings, illustrating the principles of the technology by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

DETAILED DESCRIPTION

Figure 1:
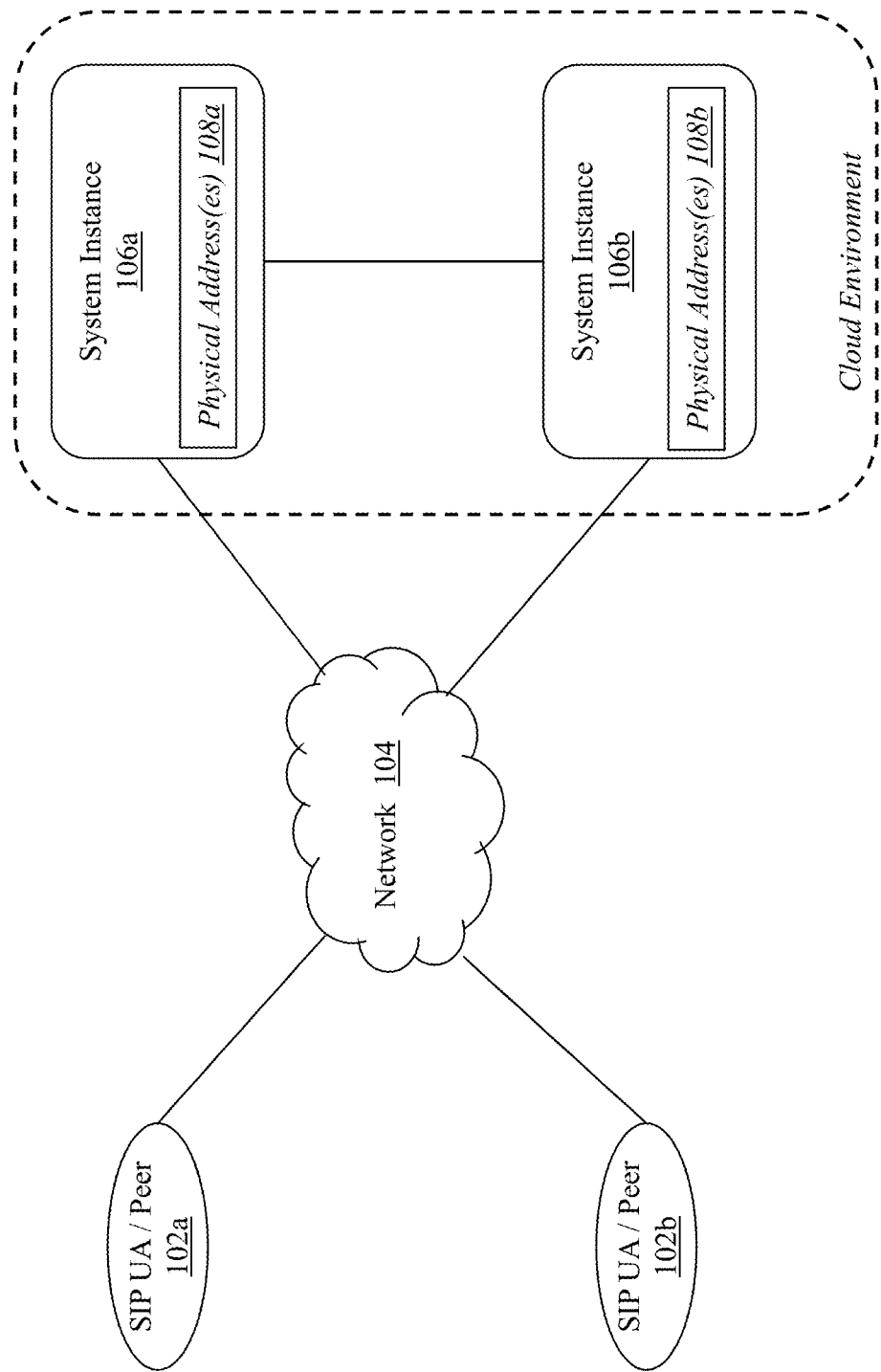
FIG. 1 is a block diagram of a first embodiment of a system for preservation of communication sessions in a geographically redundant cloud-based environment.

FIG. 1 is a block diagram of a first embodiment of a system 100 for preservation of communication sessions in a geographically redundant cloud-based environment. The system 100 includes a plurality of SIP UA/Peer devices 102a, 102b, a communications network 104, and a cloud environment having a plurality of system instances 106a, 106b. Each system instance 106a, 106b can comprise one or more cloud-based computing devices and related software for performing certain session or call-related functionality, such as authorizing and authenticating SIP UAs/Peers that attempt to connect, providing dynamic routing and other dial-plan features, providing call-based applications such as voicemail and services like transcoding and call events (e.g., forwarding, simultaneous ringing), and storing information such as user profiles, service levels, and the like.

It should be appreciated that system instance 106a and system instance 106b are geographically distinct nodes in the cloud environment that are assigned sets of different physical addresses 108a, 108b respectively. The system instances 106a, 106b communicate with each other (e.g., either directly and/or using network 104) for mirroring, redundancy, and failover purposes as will be described in detail below. In this embodiment, the system instances can comprise signaling instances (i.e., responsible for controlling and managing the call session establishment), media instances (i.e., responsible for controlling and managing the transfer of audio/video in the call session), and/or hybrid signaling/media instances—and the address(es) of the instance can comprise addresses for both signaling and media or addresses for signaling. It should further be appreciated that, in some embodiments, the mapping between the two sets of physical addresses (e.g., between address(es) 108a of system instance 106a and address(es) 108b of system instance 106b) can be one-to-one, one-to-many, or many-to-one.

In one example using the system 100 of FIG. 1, SIP UA/Peer device 102a wants to establish a communication session (e.g., call) with SIP UA/Peer device 102b. Device 102a connects to the cloud environment using communications network 104 and is registered to system instance 106a (using physical address(es) 108a) for handling the communication session. System instance 106a authenticates device 102a and transmits a SIP INVITE message to device 102b. Device 102b sends a 200 OK message back to system instance 106a, and system instance 106a transmits the 200 OK message to the originating device 102a. Device 102a acknowledges the 200 OK message, and the two devices 102a, 102b establish a communication session and begin transmitting media and signaling communications between each other via the system instance 106a. During the communication session, system instance 106a is in regular contact with system instance 106b for the purpose of transmitting certain session-related information to system instance 106b (e.g., call state information) so that system instance 106b can take control of the session in the event that system instance 106a experiences a failure.

Figure 2:
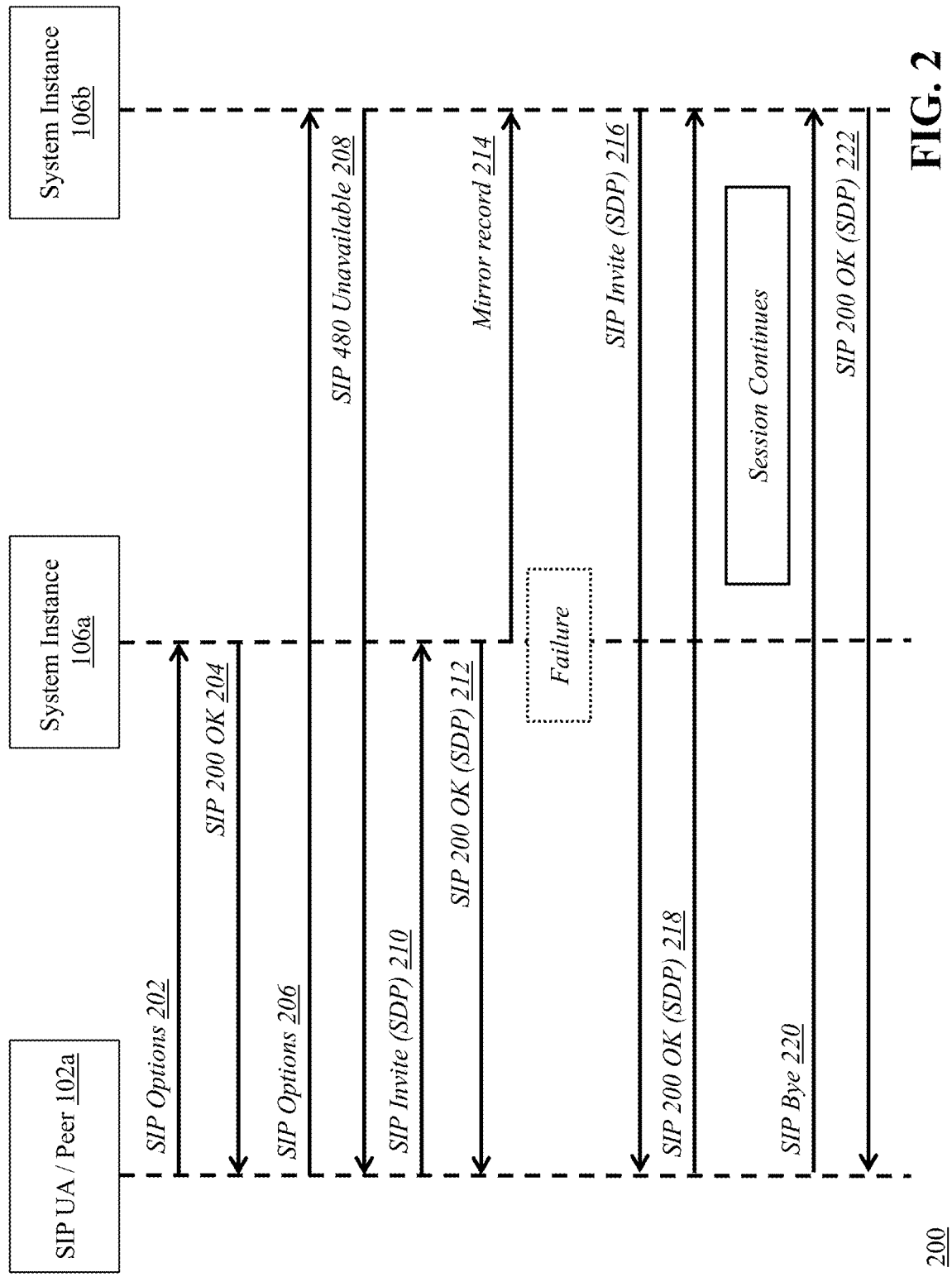
FIG. 2 is a call flow diagram of an exemplary communication session preservation flow in a SIP peering session for a cloud-based environment.

FIG. 2 is a call flow diagram 200 of an exemplary communication session preservation flow in a SIP peering session for a cloud-based environment, using the system 100 of FIG. 1. As shown in FIG. 2, SIP UA/Peer device 102a has established a SIP peering session with system instance 106a. Device 102a transmits a SIP Options message 202 to system instance 106a (e.g., as a keepalive message for the session) and system instance 106a returns a SIP 200 OK message 204 in response. Device 102a also transmits a SIP Options message 206 to system instance 106b and, because system instance 106b is not currently configured to control the session but instead is acting as a backup, system instance 106b returns a SIP 480 Unavailable message 208.

Device 102a then sends a SIP Invite request message 210 (with SDP) to system instance 106a System instance 106a returns a SIP 200 OK response message 212 (with SDP) to device 102a, indicating that the request was successful. System instance 106a also transmits a mirror record 214 (e.g., a copy of the packets comprising the communication to/from device 102a) to system instance 106b for redundancy and failover purposes. Exemplary information that can be included in a mirror record includes, but is not limited to, call state information for the particular call session such as caller number and IP address, callee number and IP address, call ID, SIP protocol tags, contact addresses, media addresses, and the like.

At some point during the communication session between device 102a and system instance 106a, the instance 106a experiences a failure as shown in FIG. 2. Because system instance 106b is in constant contact with system instance 106a, instance 106b automatically detects that instance 106a has failed and assumes control of the existing communication session with device 102a using the protocol-specific details of the session. System instance 106b transmits a SIP Invite request message 216 (with SDP) to device 102a and device 102a returns a SIP 200 OK message 218 (with SDP) acknowledging the invite. Because system instance 106b had been regularly receiving mirror records from system instance 106a, instance 106b can continue the communication session from where system instance 106a left off and without interruption. Device 102a transfers control of the session over to system instance 106b including any media stream address changes that may be necessary. It should be appreciated that the communication session between device 102a and system instance 106b uses the physical address(es) 108b of system instance 106b, and does not adopt or otherwise use the physical address(es) 108a of the failed system instance 106a. When the session concludes, device 102a transmits a SIP Bye message 220 to system instance 106b and instance 106b returns a SIP 200 OK message 222 (with SDP) acknowledging the request to end the session.

In one example of transfer of control, the system instances 106a, 106b send HA packets to each other at a predetermined interval, e.g., once a second. Those packets include information such as: operational state (i.e., active, standby), communication status to the remote instance, as well as default router connectivity. Based on the message contents, as well as the absence of receiving those messages, a system instance can make an autonomous decision as to which system needs to become active. Once that decision is made, the system instance can declare itself as active and can begin the act of pulling all of the remote sessions over to itself using the mechanisms described herein.

In addition, the backup system instance can take control of the calls using the mechanism defined by the SIP protocol. Specifically, a REINVITE that matches an existing dialog can change the Contact Address and Media Addresses used in the call. The Contact address change can instruct the far end device to use that address for all future SIP signaling messages. A media address change will cause the far end to start sending media to the new addresses.

Figure 3:
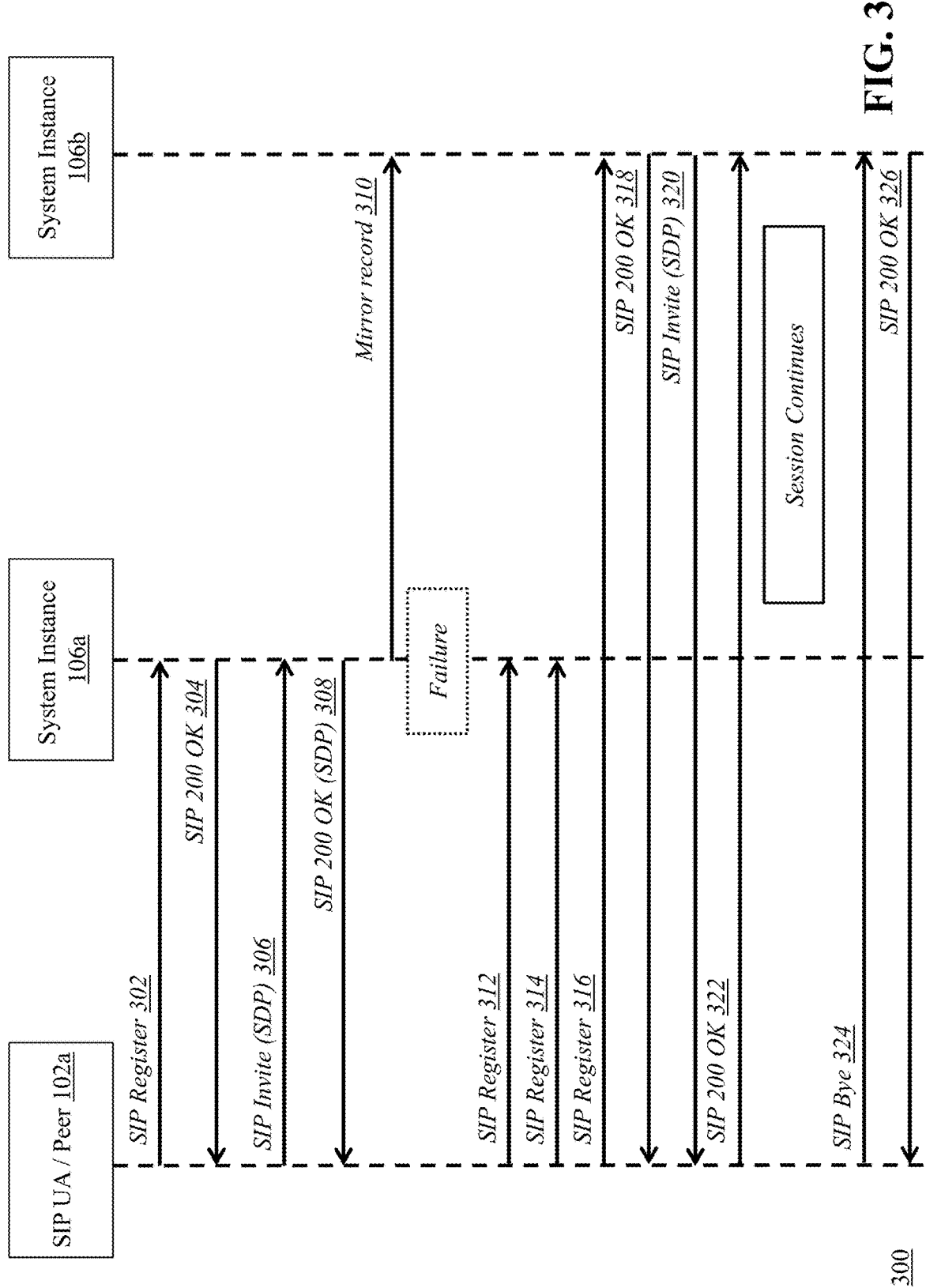
FIG. 3 is a call flow diagram of an exemplary communication session preservation flow in a SIP client session for a cloud-based environment.

FIG. 3 is a call flow diagram 300 of an exemplary communication session preservation flow in a SIP client session for a cloud-based environment, using the system 100 of FIG. 1. As shown in FIG. 3, SIP UA/Peer device 102a registers with system instance 106a by transmitting a SIP Register request message 302 to system instance 106a, which returns a SIP 200 OK message 304 in response. Device 102a transmits a SIP Invite request message 306 (with SDP) to system instance 106a to initiate a communication session (e.g., with SIP UA/Peer device 102b). Instance 106a returns a SIP 200 OK message 308 (with SDP) to indicate that the request was successful. System instance 106a also transmits a mirror record 310 (e.g., a copy of the packets comprising the communication to/from device 102a) to system instance 106b for redundancy and failover purposes.

At some point during the communication session between device 102a and system instance 106a, the instance 106a experiences a failure as shown in FIG. 3. Because system instance 106b is in constant contact with system instance 106a, instance 106b automatically detects that instance 106a has failed and assumes control of the existing communication session. with device 102a using the protocol-specific details of the session.

However, system instance 106b may not be able to communicate immediately with device 102a (e.g., because device 102a is located behind a network firewall). In this case, device 102a detects that system instance 106a has failed by transmitting a plurality of SIP Register messages 312, 314 to system instance 106a and not receiving any acknowledgements from instance 106a.

In this example, device 102a has been pre-configured to connect to system instance 106b with physical address(es) 108b in the event that system instance 106a fails. Accordingly, device 102a transmits a SIP register message 316 to system instance 106b and instance 106b sends back a SIP 200 OK message 318. Once device 102a has successfully registered with system instance 106b, instance 106b takes control of the communication session and transmits a SIP Invite message 320 (with SDP) to device 102a. Because system instance 106b had been regularly receiving mirror records from system instance 106a, instance 106b can continue the communication session from where system instance 106a left off and without interruption.

In response to SIP Invite message 320, device 102a transmits a SIP 200 OK message 322 to system instance 106b AND transfers control of the session over to system instance 106b including any media stream address changes that may be necessary. It should be appreciated that the communication session between device 102a and system instance 106b uses the physical address(es) 108b of system instance 106b, and does not adopt or otherwise use the physical address(es) 108a of the failed system instance 106a. When the session concludes, device 102a transmits a SIP Bye message 324 to system instance 106b and instance 106b returns a SIP 200 OK message 326 (with SDP) acknowledging the request to end the session.

Figure 4:
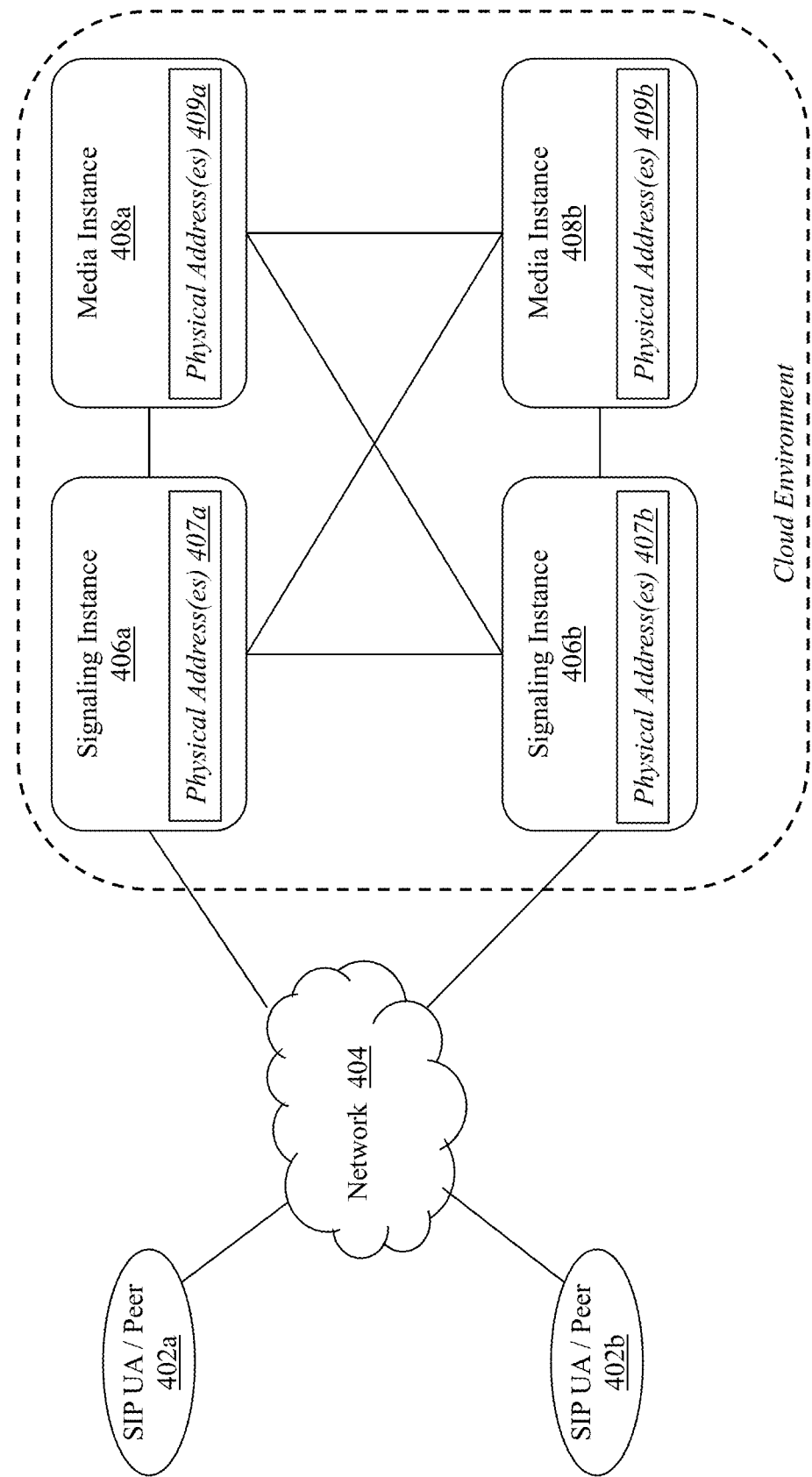
FIG. 4 is a block diagram of a second embodiment of a system for preservation of communication sessions in a geographically redundant cloud-based environment.

FIG. 4 is a block diagram of a second embodiment of a system 400 for preservation of communication sessions in a geographically redundant cloud-based environment. The system 400 includes SIP UA/Peer devices 402a, 402b; communications network 404; a plurality of signaling instances 406a, 406b, each assigned a set of physical addresses 407a, 407b respectively; and a plurality of media instances 408a, 408b, each assigned a set of physical addresses 409a, 409b respectively. It should be appreciated that, in this embodiment, the signaling instances control and manage the signaling aspect (e.g., setup, tear down) of the call session between, e.g., device 402a and 402b, while the media instances control and manage the media (i.e., audio/video) aspect of the call session. Also, in this embodiment, the signaling instances are assigned different sets of physical addresses from both each other and from the media instances.

Figure 5:
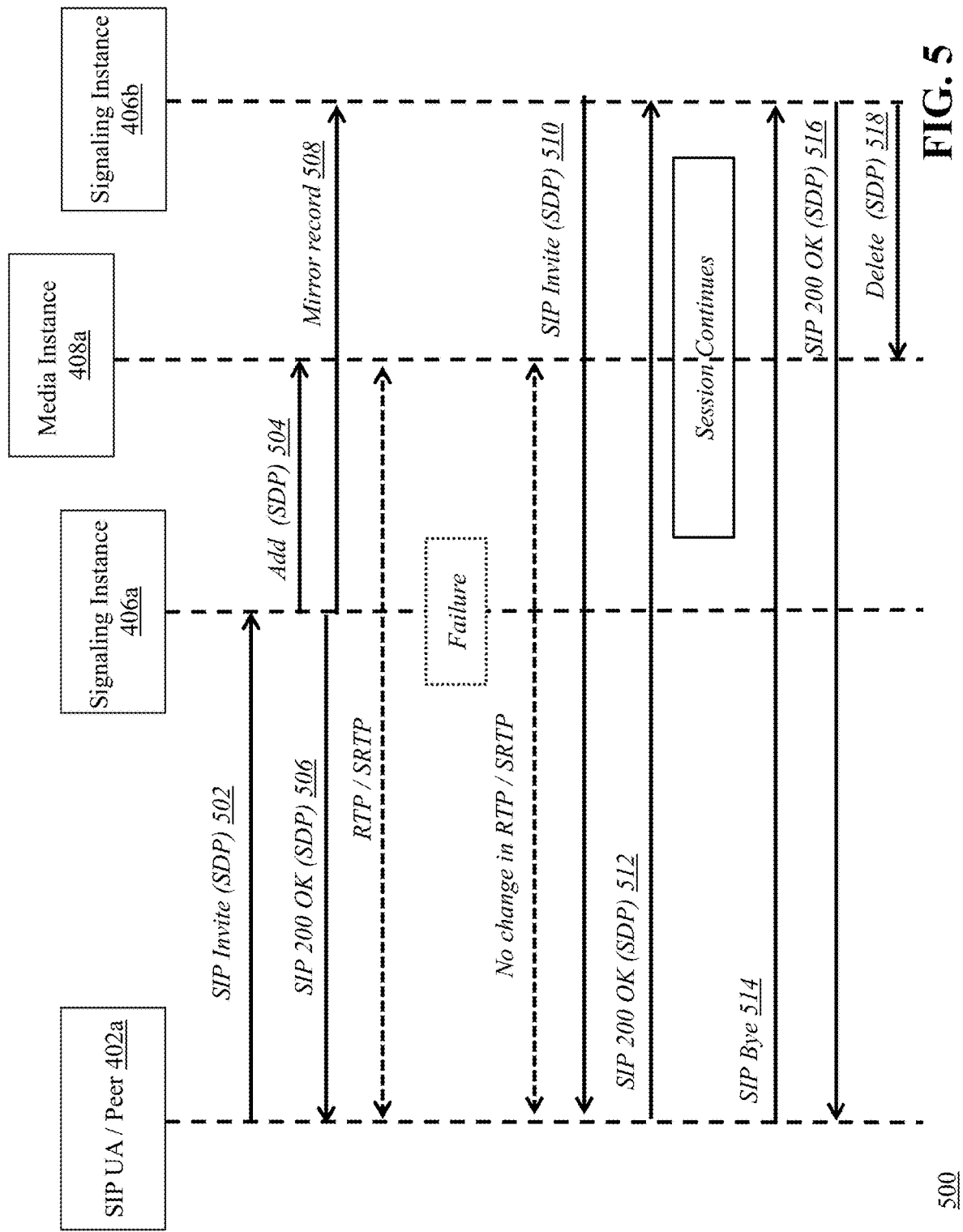
FIG. 5 is a call flow diagram of an exemplary communication session preservation flow when a signaling instance fails in a cloud-based environment.

In some circumstances, during a communication session, a signaling instance can experience a failure while the corresponding media instance maintains the current session (or vice versa). FIG. 5 is a call flow diagram 500 of an exemplary communication session preservation flow when a signaling instance fails in a cloud-based environment, using the system 400 of FIG. 4. As shown in FIG. 5, SIP UA/Peer device 402a transmits a SIP Invite message 502 (with SDP) to signaling instance 406a for the purposes of establishing a communication session with device 402b. The signaling instance 406a transmits an add command 504 (with the SDP) to media instance 408a so that the media instance can manage the exchange of audio/video packets between the devices 402a, 402b. In response to the invite message, the signaling instance 406a returns a SIP 200 OK message 506 (with the SDP) back to device 402a. The signaling instance 406a also transmits a mirror record 508 to signaling instance 406b for redundancy and failover purposes. Once the call is setup, SIP UA/Peer device 402a establishes a Real-Time Protocol (RTP)/Secure Real-Time Protocol (SRTP) session with media instance 408a.

During the session, signaling instance 406a experiences a failure, as shown in FIG. 5. Because signaling instance 406b is in constant contact with signaling instance 406a, signaling instance 406b automatically detects that signaling instance 406a has failed and assumes control of the signaling aspect of the existing communication session with device 402a using the specific signaling details of the session. In addition, because media instance 408a has not failed, there is no change in the RTP/SRTP session information.

To maintain the communication session, signaling instance 406b transmits a SIP Invite request message 510 (with the SDP) to device 402a and device 402a returns a SIP 200 OK message 512 (with SDP) acknowledging the invite. Because signaling instance 406b had been regularly receiving mirror records from signaling instance 406a, signaling instance 406b can continue the communication session from where signaling instance 406a left off and without interruption. Device 402a transfers control of the signaling aspect of the session over to signaling instance 406b and the session continues. It should be appreciated that the communication session between device 402a and signaling instance 406b uses the physical address(es) 407b of signaling instance 406b, and does not adopt or otherwise use the physical address(es) 407a of the failed signaling instance 406a. When the session concludes, device 402a transmits a SIP Bye message 514 to signaling instance 406b and instance 406b returns a SIP 200 OK message 516 (with SDP) acknowledging the request to end the session. Signaling instance 406b then transmits a delete command 518 (with the SDP) to media instance 408a.

Figure 6:
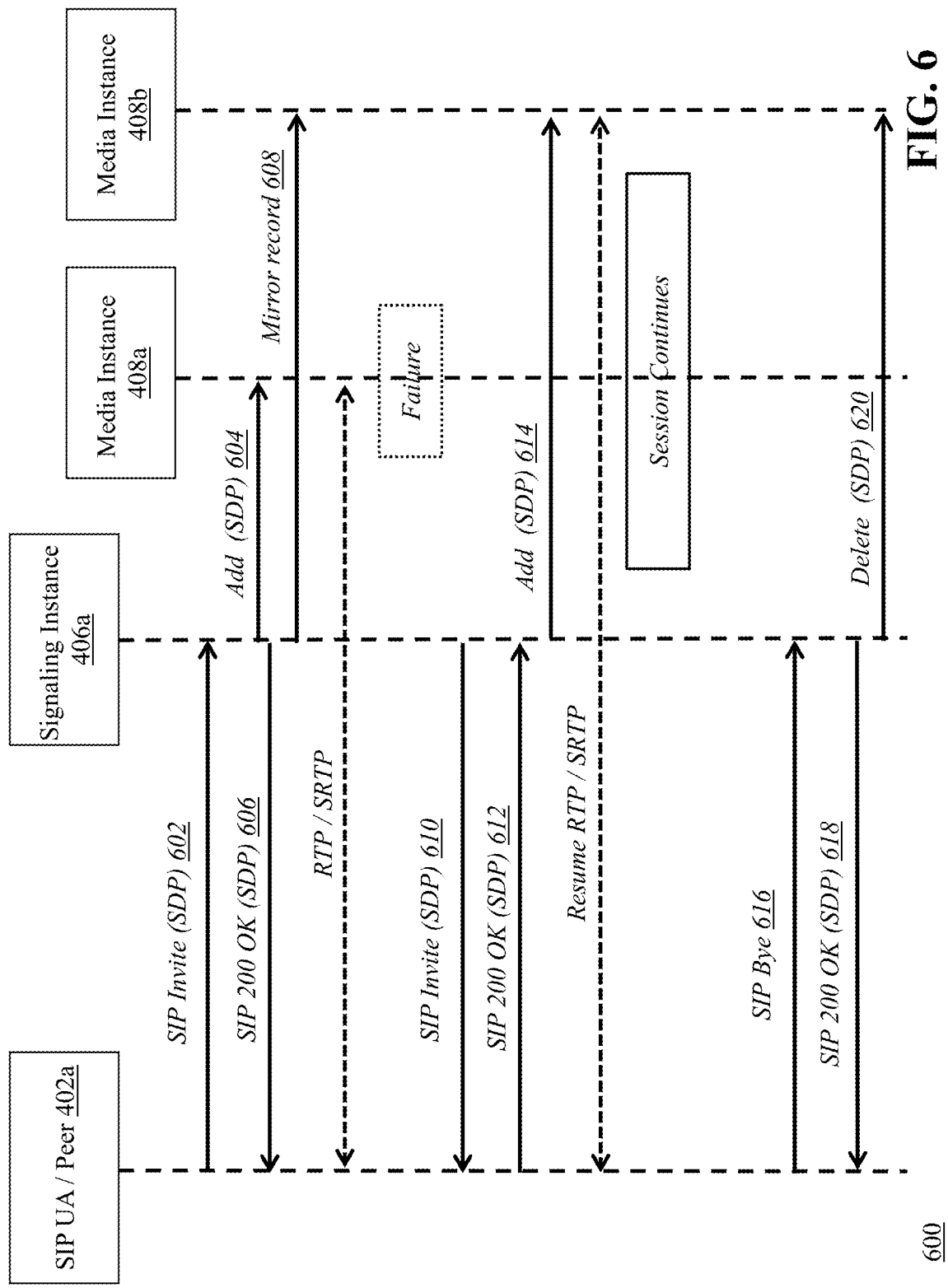
FIG. 6 is a call flow diagram of an exemplary communication session preservation flow when a media instance fails in a cloud-based environment.

FIG. 6 is a call flow diagram 600 of an exemplary communication session preservation flow when a media instance fails in a cloud-based environment, using the system 400 of FIG. 4. As shown in FIG. 6, SIP UA/Peer device 402a transmits a SIP Invite message 602 (with SDP) to signaling instance 406a for the purposes of establishing a communication session with device 402b. The signaling instance 406a transmits an add command 604 (with the SDP) to media instance 408a so that the media instance can manage the exchange of audio/video packets between the devices 402a, 402b. In response to the invite message, the signaling instance 406a returns a SIP 200 OK message 606 (with the SDP) back to device 402a. The signaling instance 406a also transmits a mirror record 608 to media instance 408b for redundancy and failover purposes. Once the call is setup, SIP UA/Peer device 402a establishes a Real-Time Protocol (RTP)/Secure Real-Time Protocol (SRTP) session with media instance 408a.

During the session, media instance 408a experiences a failure, as shown in FIG. 6. Because media instance 408b is in constant contact with signaling instance 406a, media instance 408b is able to determine that media instance 406a has failed.

To maintain the communication session, signaling instance 406a transmits a SIP Invite request message 610 (with SDP) to device 402a and device 402a returns a SIP 200 OK message 612 (with SDP) acknowledging the invite. Signaling instance 406a then transmits an add command 614

(with SDP) to media instance 408b. Because media instance 408b had been regularly receiving mirror records from signaling instance 406a, media instance 408b can continue the communication session from where media instance 408a left off and without interruption. Device 402a resumes the RTP/SRTP session, this time with media instance 408b, and the communication session continues. It should be appreciated that the communication session between device 402a and media instance 408b uses the physical address(es) 409b of media instance 408b, and does not adopt or otherwise use the physical address(es) 409a of the failed media instance 408a. When the communication session concludes, device 402a transmits a SIP Bye message 616 to signaling instance 406a and instance 406a returns a SIP 200 OK message 618 (with SDP) acknowledging the request to end the session. Signaling instance 406a then transmits a delete command 620 (with the SDP) to media instance 408b.

Figure 7:
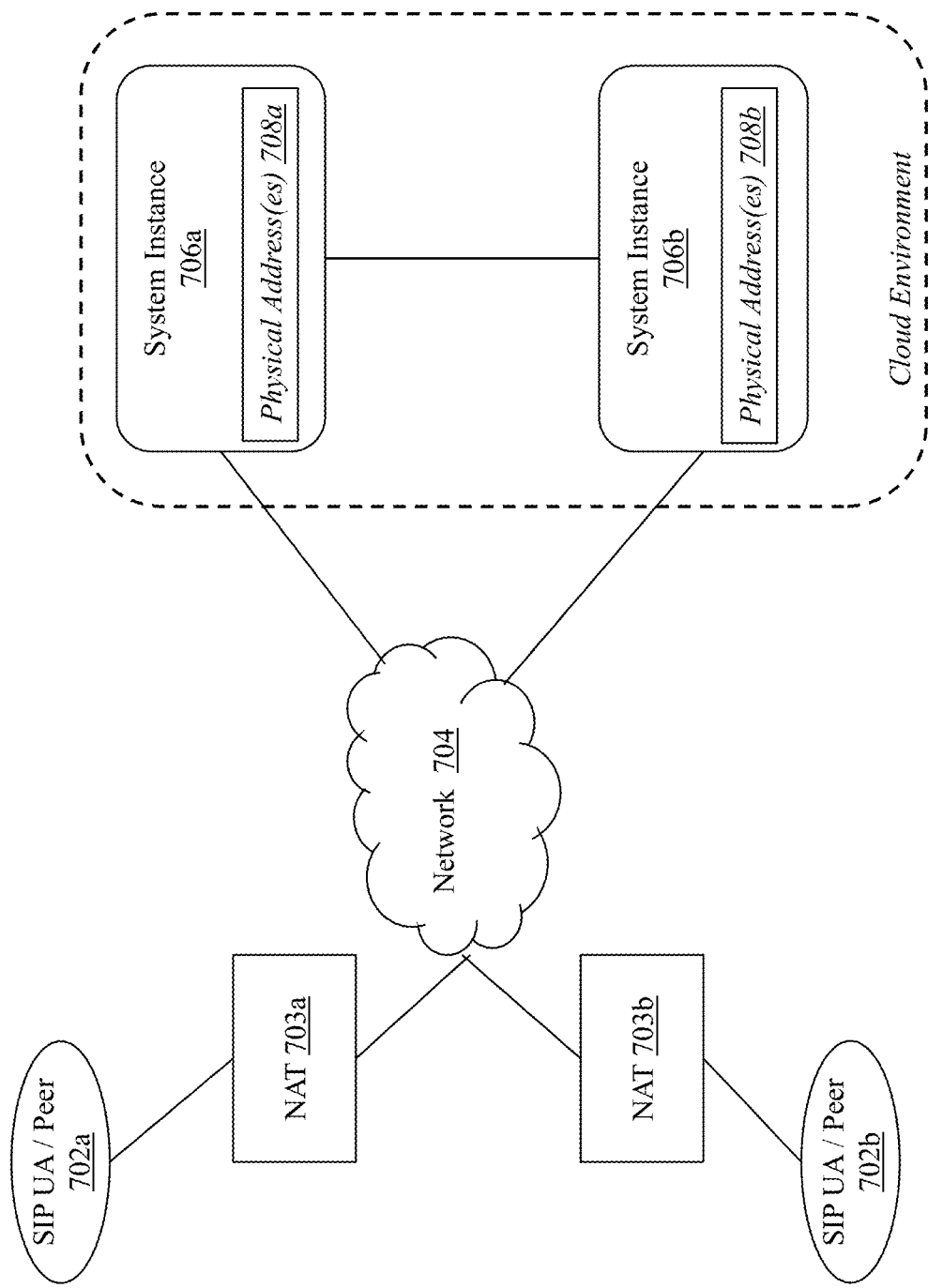
FIG. 7 is a block diagram of a second embodiment of a system for preservation of communication sessions in a geographically redundant cloud-based environment.

The above-described techniques are further applicable in a network paradigm that incorporates firewalls and/or Network Address Translation (NAT) devices in the signaling path between SIP UAs and the system instances in the cloud environment. FIG. 7 is a block diagram of another embodiment of a system 700 for preservation of communication sessions in a geographically redundant cloud-based environment. The system 700 includes a plurality of SIP UA/Peer devices 702a, 702b, a firewall/NAT device 703a, 703b coupled to a corresponding SIP UA/Peer device, a communications network 704, and a cloud environment having a plurality of system instances 706a, 706b. As noted above with respect to FIG. 1, each system instance 706a, 706b can comprise one or more cloud-based computing devices and related software for performing certain session or call-related functionality, such as authorizing and authenticating SIP UAs/Peers that attempt to connect, providing dynamic routing and other dial-plan features, providing call-based applications such as voicemail and services like transcoding and call events (e.g., forwarding, simultaneous ringing), and storing information such as user profiles, service levels, and the like.

It should be appreciated that system instance 706a and system instance 706b are geographically distinct nodes in the cloud environment that are assigned sets of different physical addresses 708a, 708b respectively. The system instances 706a, 706b communicate with each other (e.g., either directly and/or using network 704) for mirroring, redundancy, and failover purposes as described in detail above. In this embodiment, the system instances can comprise signaling instances (i.e., responsible for controlling and managing the call session establishment), media instances (i.e., responsible for controlling and managing the transfer of audio/video in the call session), and/or hybrid signaling/media instances—and the address(es) of the instance can comprise addresses for both signaling and media or addresses for signaling. It should further be appreciated that, in some embodiments, the mapping between the two sets of physical addresses (e.g., between address(es) 708a of system instance 706a and address(es) 708b of system instance 706b) can be one-to-one, one-to-many, or many-to-one.

In one example using the system 700 of FIG. 7, SIP UA/Peer device 702a wants to establish a communication session (e.g., call) with SIP UA/Peer device 702b. Device 702a connects to the cloud environment via Firewall/NAT 703a using communications network 704 and is registered to system instance 706a (using physical address(es) 708a) for handling the communication session. As can be appreciated, the Firewall/NAT 703a modifies the messages transmitted from the SIP UA/Peer device 702a by remapping an address assigned to the SIP UA/Peer device 702a in the packets to another address. System instance 706a authenticates device 702a and transmits a SIP INVITE message to device 702b via Firewall/NAT 703b, which performs a similar remapping of an address of SIP UA/Peer device 702b. Device 702b sends a 200 OK message back to system instance 706a, and system instance 706a transmits the 200 OK message to the originating device 702a. Device 702a acknowledges the 200 OK message, and the two devices 702a, 702b establish a communication session and begin transmitting media and signaling communications between each other via the system instance 706a. During the communication session, system instance 706a is in regular contact with system instance 706b for the purpose of transmitting certain session-related information to system instance 706b (e.g., call state information) so that system instance 706b can take control of the session in the event that system instance 706a experiences a failure.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more special-purpose processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

The invention claimed is:

1. A system for preservation of communication sessions in a geographically redundant cloud-based environment, the system comprising:
   a plurality of end point devices; and
   a plurality of cloud-based system instances each comprising one or more server computing devices;
   wherein a first cloud-based system instance assigned a first physical address is configured to:
      establish a communication session using the first physical address between a first end point device and a second end point device, and
      mirror information associated with the communication session to a second cloud-based system instance assigned a second physical address, wherein the mirrored information comprises call state information for the communication session;
   wherein the second cloud-based system instance is configured to:
      detect a failure of the first cloud-based system instance during the communication session, including determining that the failure of the first cloud-based system instance has occurred based upon packet data received from the first cloud-based system instance;
      take control of the communication session using the mirrored information including transmitting a communication session invite message to the first end point device and the second end point device and receiving an acknowledgment to the communication session invite message from the first end point device and the second end point device; and
      maintain the communication session between the first end point device and the second end point device using the second physical address.

2. The system of claim 1, wherein each of the plurality of cloud-based system instances are in a different geographical location.

3. The system of claim 1, wherein the first physical address and the second physical address are different.

4. The system of claim 1, wherein the communication session is a Session Initiation Protocol (SIP) session.

5. The system of claim 1, wherein the communication session is a Voice-over-IP (VoIP) session.

6. The system of claim 1, wherein the first end point device is a SIP User Agent (UA) and the second end point device is a SIP UA.

7. The system of claim 1, wherein the first end point device is a SIP Peer.

* * * * *